US006769510B2

(12) United States Patent
Ueno et al.

(10) Patent No.: US 6,769,510 B2

(45) Date of Patent: Aug. 3, 2004

(54) ENGINE COVER

(75) Inventors: Kazushige Ueno, Gifu-ken (JP); Yoshikazu Tanaka, Gifu-ken (JP)

(73) Assignee: Pacific Industrial Co., Ltd., Gifu-Ken (JP)

( * ) Notice: Subject to any disclaimer, the term of this patent is extended or adjusted under 35 U.S.C. 154(b) by 0 days.

(21) Appl. No.: 10/347,082

(22) Filed: Jan. 17, 2003

(65) Prior Publication Data

US 2004/0007421 A1 Jan. 15, 2004

(30) Foreign Application Priority Data

Jul. 15, 2002 (JP) ....................................... 2002-205127

(51) Int. Cl.[7] .......................... G10K 11/00; B60R 13/08

(52) U.S. Cl. ........................ 181/204; 181/204; 181/205

(58) Field of Search ................................ 181/204, 205, 181/198, 293, 30, 295; 296/39.1, 39.3; 150/157, 901

(56) References Cited

U.S. PATENT DOCUMENTS 4,027,644 A * 6/1977 Timour ........................ 181/204
4,114,714 A * 9/1978 Fachbach et al. ........... 181/204
4,122,820 A * 10/1978 Ryberg ........................ 181/204
4,498,433 A * 2/1985 Ogawa ........................ 181/204
4,966,799 A * 10/1990 Lucca et al. ................ 181/294
5,633,067 A * 5/1997 Illbruck et al. ............. 181/204
5,744,763 A * 4/1998 Iwasa et al. ................ 181/286
5,928,043 A * 7/1999 Rinzaki ....................... 181/229
5,971,099 A * 10/1999 Yasuda et al. .............. 181/286
6,524,691 B2 * 2/2003 Sugawara et al. .......... 181/294
6,581,720 B1 * 6/2003 Chen et al. ................. 181/205
6,601,673 B2 * 8/2003 Murakami et al. .......... 181/204
6,631,937 B2 * 10/2003 Miyakawa et al. ........ 296/39.1

FOREIGN PATENT DOCUMENTS

DE 3733284 A1 * 4/1989 ........... B60R/13/08
GB 2094948 A * 9/1982 ........... G10K/11/16
JP 53041656 A * 4/1978 ............ F16M/1/00
JP 5-78723 10/1993
JP 08-218890 8/1996
JP 09-302717 11/1997
JP 10-159535 6/1998
JP 2002-028934 1/2002

* cited by examiner

*Primary Examiner*—Robert Nappi
*Assistant Examiner*—Eduardo Colon Santana
(74) *Attorney, Agent, or Firm*—Akin Gump Strauss Hauer & Feld, LLP

(57) ABSTRACT

An engine cover mounted to an internal combustion engine of an automobile etc. includes a rigid cover body made of a resin or metal and covering an engine, a foamed member fixed to an inner face of the cover body and including at least a part spaced from the engine, and a plurality of corrugations formed on the part of the foamed member spaced from the engine.

6 Claims, 13 Drawing Sheets

ENGINE COVER

BACKGROUND OF THE INVENTION

1. Field of the Invention

This invention relates generally to an engine cover mounted on internal combustion engines of automobiles or the like, and more particularly to such an engine cover including a rigid cover body made from a resin or metal and covering an engine, and a foamed member fixed to an inner face of the cover body.

2. Description of the Related Art

JP-A-2002-28934 discloses one of conventional engine covers of the above-described type. The disclosed engine cover comprises a cover body made of a resin or metal and a foamed member fixed to a back side or inner face of the cover body. The foamed member has a configuration conforming to an outer surface of the engine and is pressed onto the outer surface of the engine. However, the above-described conventional engine cover cannot achieve a sufficient sound reduction.

SUMMARY OF THE INVENTION

Therefore, an object of the present invention is to provide an engine cover which can effectively reduce sound produced by the engine.

The present invention provides an engine cover comprising a rigid cover body made of a resin or metal and covering an engine, a foamed member fixed to an inner face of the cover body and including at least a part thereof spaced from the engine, and a plurality of corrugations formed on the part of the foamed member spaced from the engine.

A sound-absorbing area of the engine cover is increased with increase in a surface area of the foamed member since the foamed member is formed with a plurality of corrugations. Consequently, sound produced by the engine can effectively be reduced. Further, since a part of the foamed member is spaced from the engine, a space is defined between the foamed member and the engine. Consequently, sound produced by the engine can be damped by air in the space.

In a preferred form, the corrugations are disposed on an inner face of the expanded portion so that the space is defined between the foamed member and the engine.

In another preferred form, a difference between a ridge of each protrusion and a trough between said each protrusion and the adjacent protrusion is set at a quarter of a wavelength of the predetermined sound, the quarter being multiplied by any integer. The predetermined sound interferes with sound reflected on the corrugations thereby to deny each other. Consequently, the predetermined sound can effectively be reduced.

In further another preferred form, the engine cover includes a wall standing from an edge of the foamed member so as to extend toward the engine. Since the sound-leakage preventing wall restrains sound produced by the engine from leaking outside the foamed member, the sound produced by the engine can effectively be reduced.

Additionally, in further another preferred form, the cover body includes a rib projecting toward the engine from a peripheral edge of the expanded portion on an inner face thereof. The rib can improve the rigidity of the cover body. The improvement in the rigidity of the cover body can restrain the engine cover from vibrating due to vibration produced by the engine.

BRIEF DESCRIPTION OF THE DRAWINGS

Other objects, features and advantages of the present invention will become clear upon reviewing the following description of embodiments, made with reference to the accompanying drawings, in which.

DETAILED DESCRIPTION OF THE INVENTION

Figure 1:
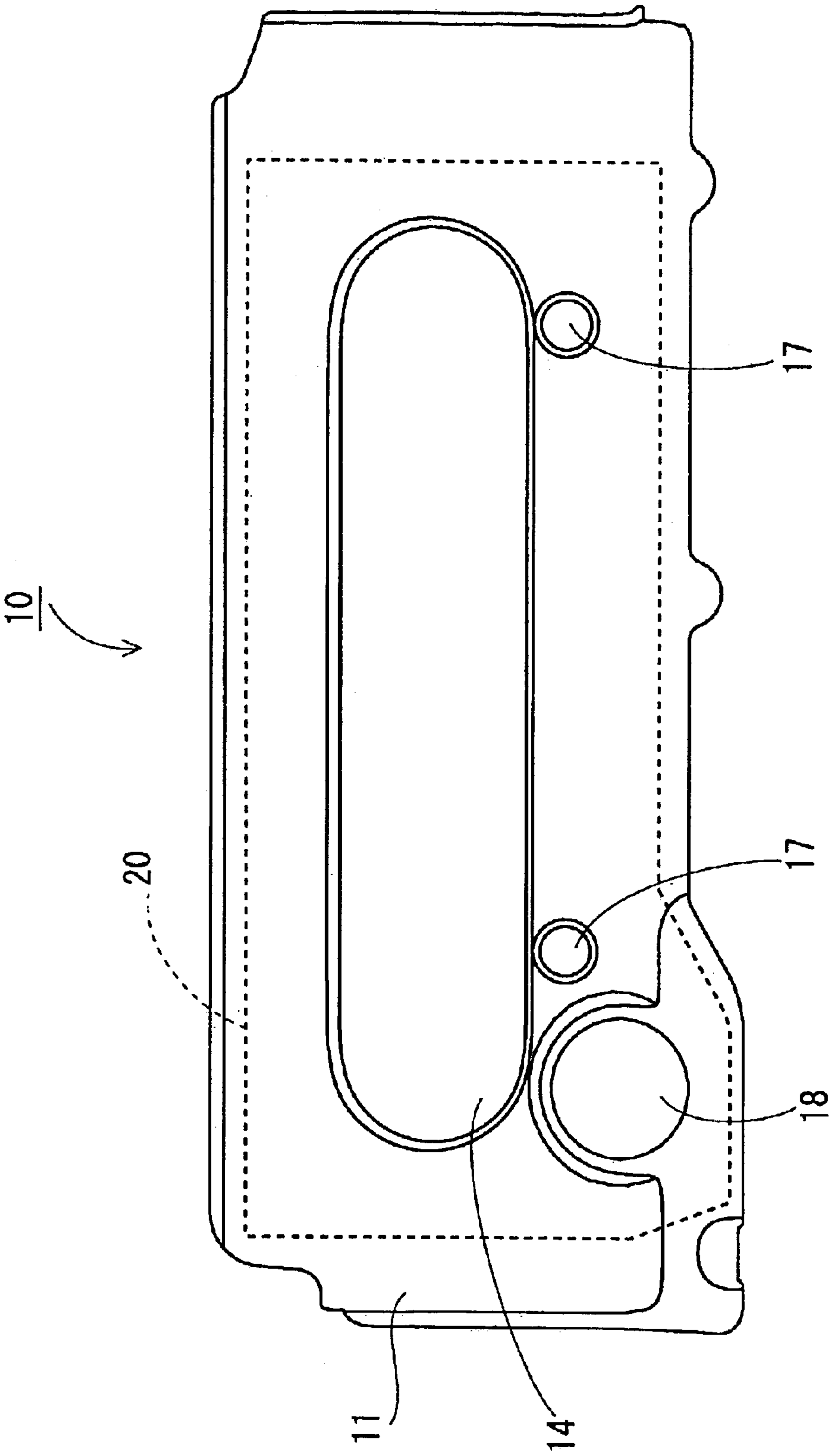
FIG. 1 is a plan view of an engine cover in accordance with one embodiment of the present invention.

One embodiment of the invention will be described with reference to FIGS. 1 to 13. Referring to FIG. 1, an engine cover 10 in accordance with one embodiment of the present invention is shown. The shown engine cover 10 comprises a rigid cover body 11 having an inner face 12 to which a foamed member 20 made of, for example, an urethane resin is attached. The engine cover 10 is mounted to an engine 90 so as to cover an upper end of the engine. The urethane resin made into the foamed member 20 includes polyethylene terephthalate, nylon or polypropylene resin. The cover body 11 of the engine cover 10 is made of a metal such as aluminum. The cover body 11 is transversely elongated so as to conform to the engine 90 and has a front edge (a right-hand edge as viewed in FIG. 2) curved downward as shown in FIG. 2.

The cover body 11 is formed with an expanded portion 14 expanded toward the side away from the engine 90. The expanded portion 14 has a generally elliptic shape and is elongated in a lengthwise direction of the cover body 11. The cover body 11 includes a rib 16 projecting toward the engine 90 from a peripheral edge of the expanded portion 14 on an inner face thereof. An improvement in the rigidity of the cover body 11 can restrain the engine cover 10 from vibrating due to vibration produced by the engine 90. The cover body 11 has a pair of mounting holes 17 formed through a portion thereof in front of the expanded portion 14 for the purpose of mounting the engine cover to the engine 90. The cover body 11 further has an oil feeding hole 18 formed therethrough so as to be located near one of the mounting holes 17.

Figure 2:
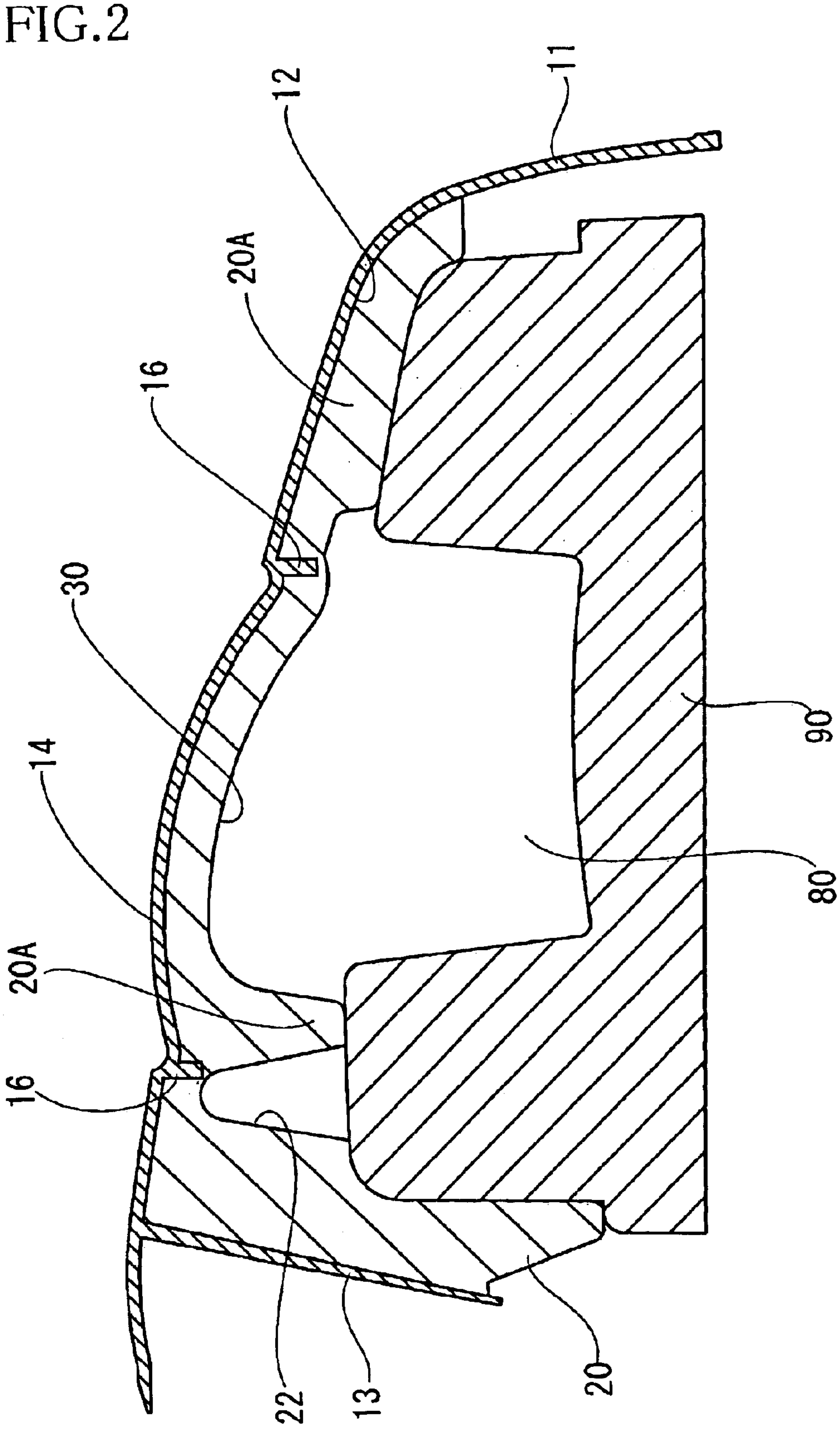
FIG. 2 is a sectional view of the engine cover.

A fixing wall 13 extends downward from a rear edge of the cover body 11 (a right-hand edge as viewed in FIG. 2) as shown in FIG. 2. The fixing wall 13 extends longer than the expanded portion 14, and a foamed member 20 is fixed to the cover body 11 so as to extend from a front face of the fixing wall 13 to a front edge of the inner face 12 of the cover body.

The foamed member 20 includes engine abutments 20A formed on the front and rear ends (left-hand and right-end ends as viewed in FIG. 2) thereof respectively. The foamed member 20 has a configuration conforming to an outer surface of the engine 90 and is pressed against the outer surface of the engine. A middle portion of the foamed member 20 is curved toward the side opposed to the engine 90 so as to conform to the expanded portion 14 of the cover body 11. As a result, when the engine cover 10 is mounted to the engine 90, the middle portion of the foamed member 20 is spaced from the engine such that a space 80 is defined between the engine and the foamed member 20.

Figure 5:
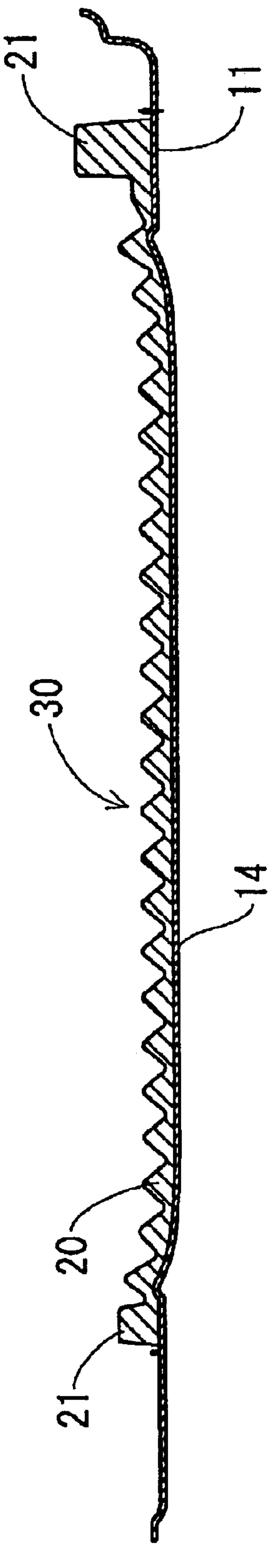
FIG. 5 is a sectional view of the engine cover.

A sound-leakage preventing wall 21 protrudes from a side edge of the foamed member 20 as shown in FIG. 5. The wall 21 has a lower end abutted against the outer surface of the engine 90 so that sound produced by the engine 90 is restrained from leaking outside the foamed member 20. The foamed member 20 includes a portion extending along the fixing wall 13 and formed with a plurality of conical holes 22 as shown in FIG. 3.

Figure 3:
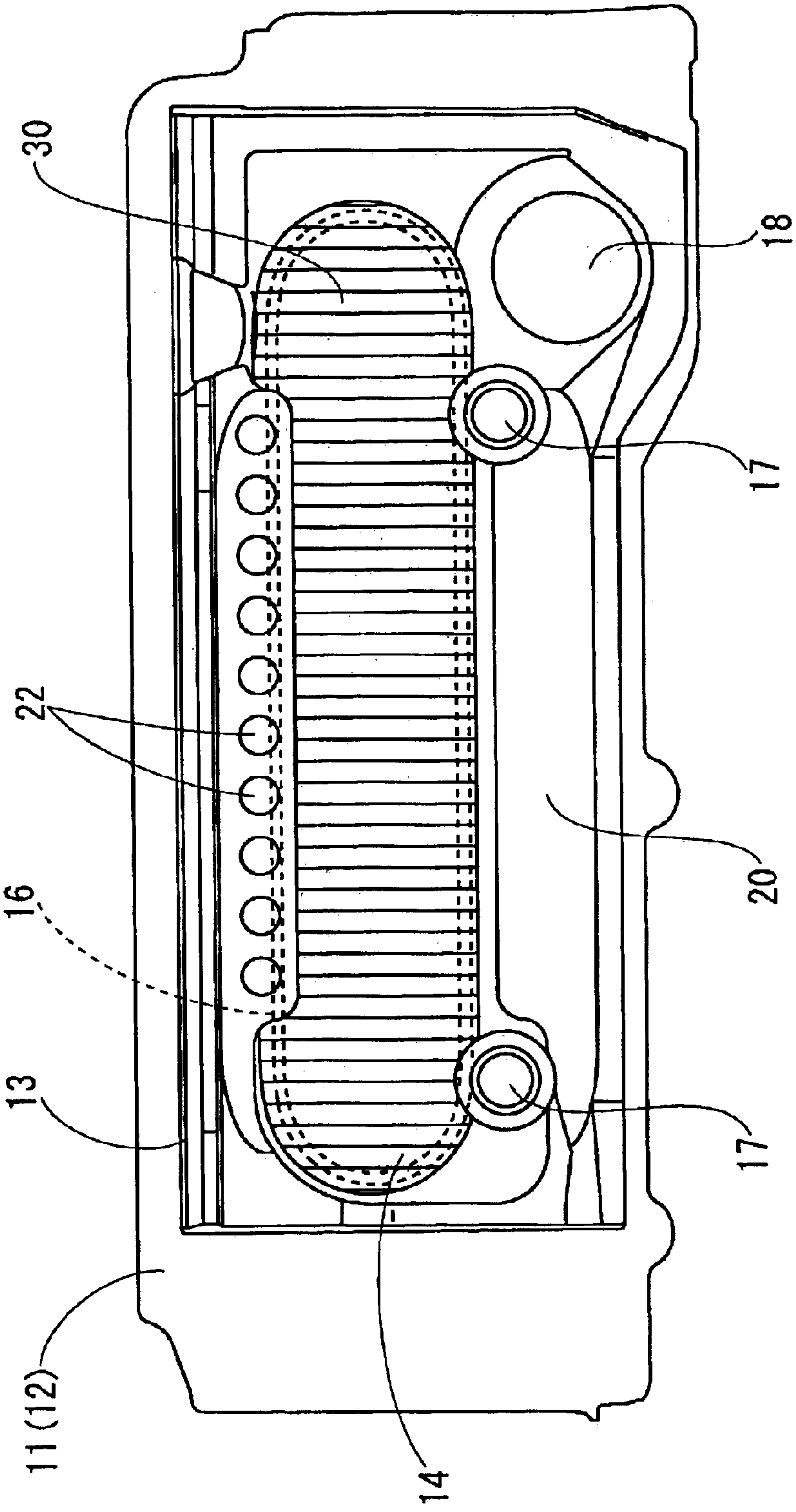
FIG. 3 is a rear view of the engine cover.
Figure 4:
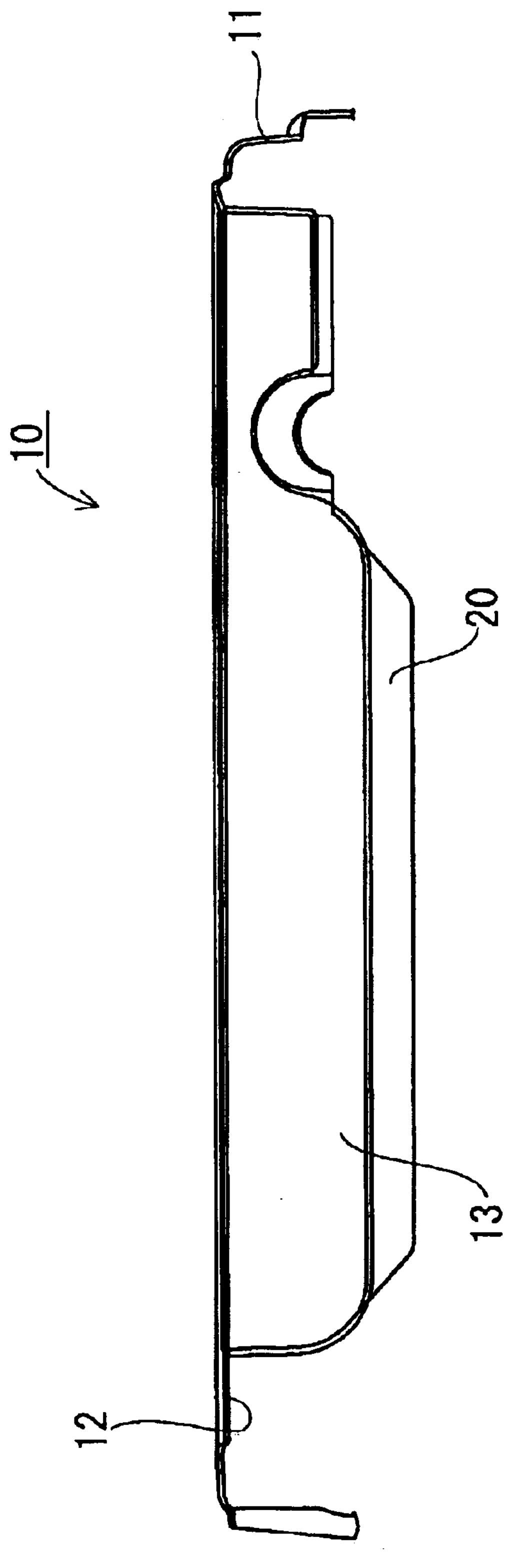
FIG. 4 is a side view of the engine cover.

The foamed member 20 includes a portion covering the expanded portion 14 of the cover body 11 and formed with a plurality of corrugations 30 curved toward the side opposed to the engine 90 so as to conform to the expanded portion 14 of the cover body 11, as shown in FIGS. 2 and 3. The corrugations 30 include a row of triangular protrusions extending crosswise relative to the elongation of the expanded portion 14 and tapered toward a ridge line. The protrusions are arranged lengthwise with respect to the expanded portion 14 such that concave and convex portions or ridges and troughs are formed alternately lengthwise with respect to the expanded portion.

Figure 6:
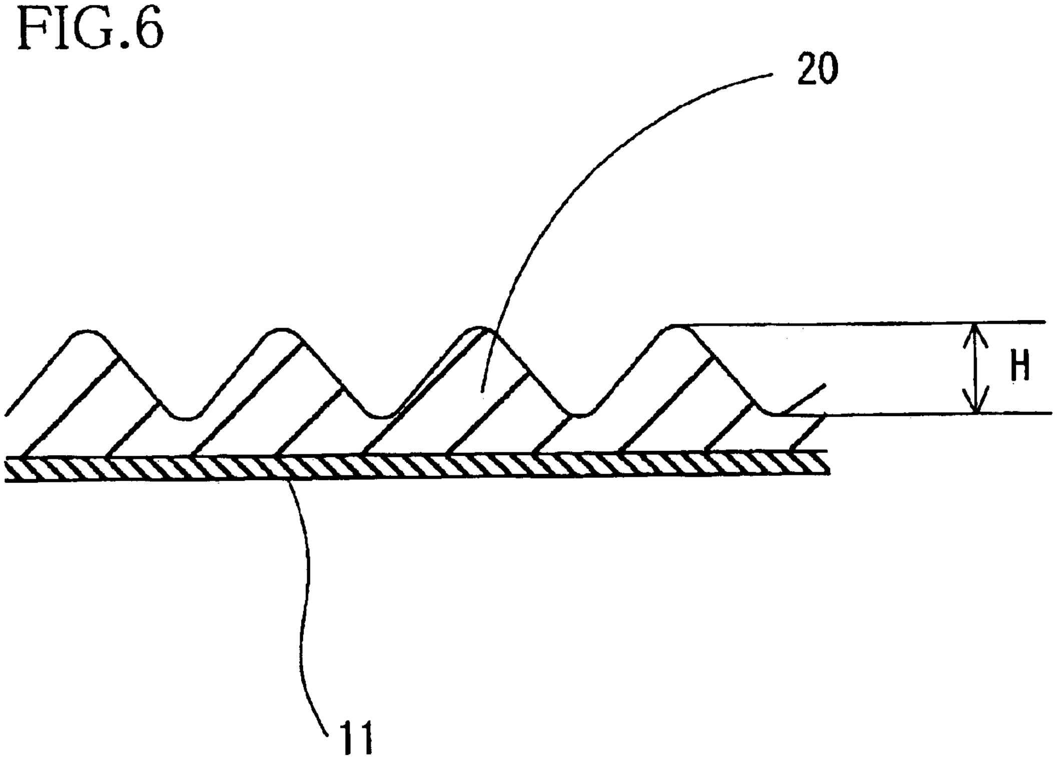
FIG. 6 is a sectional view of a corrugated portion of the engine cover.

A difference H between the ridge of each corrugation 30 and the trough between each corrugation 30 and the adjacent one as shown in FIG. 6 is determined on the basis of a range of sound produced by the engine 90 and targeted for noise reduction. More specifically, when reference symbol "f" designates a frequency of predetermined sound produced by the engine 90, the difference H is a quarter of a wavelength λ of the predetermined sound obtained from the following equation:

$$\lambda(mm)=3.4\times 10/f.$$

In the embodiment, the difference H becomes 21 mm in order that noise reduction is directed to sound whose frequency is 4 kHz.

According to the foregoing embodiment, a sound-absorbing surface area of the engine cover 10 is increased since the foamed member 20 is formed with a plurality of corrugations 30. Consequently, sound produced by the engine 90 can effectively be reduced. Furthermore, the space 80 is defined between the corrugations 30 and the engine 90, and the corrugations are disposed inside the expanded portion 14. Consequently, the space 80 is increased such that sound produced by the engine 90 can be damped by air in the space 80, whereupon sound can be reduced further effectively. Additionally, since the predetermined sound interferes with sound reflected on the corrugations thereby to deny each other, the predetermined sound can effectively be reduced.

Experiment 1:

The inventors conducted experiments to examine an amount of sound absorbed by the foamed member with the corrugations 30.

Figure 7:
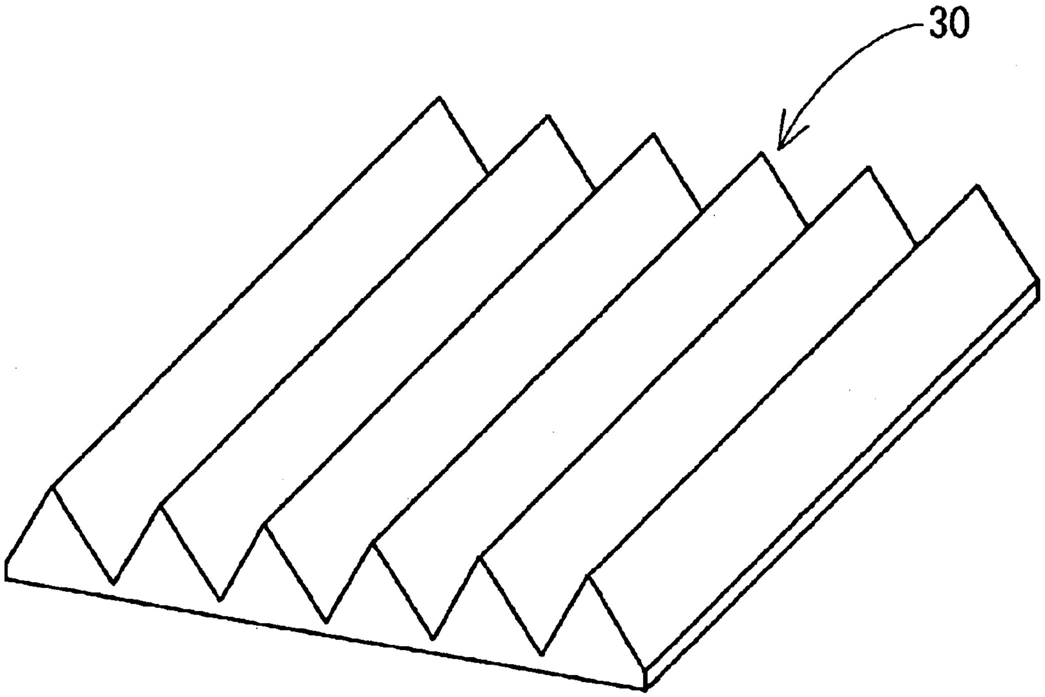
FIG. 7 is a perspective view of a foamed member A.
Figure 8:
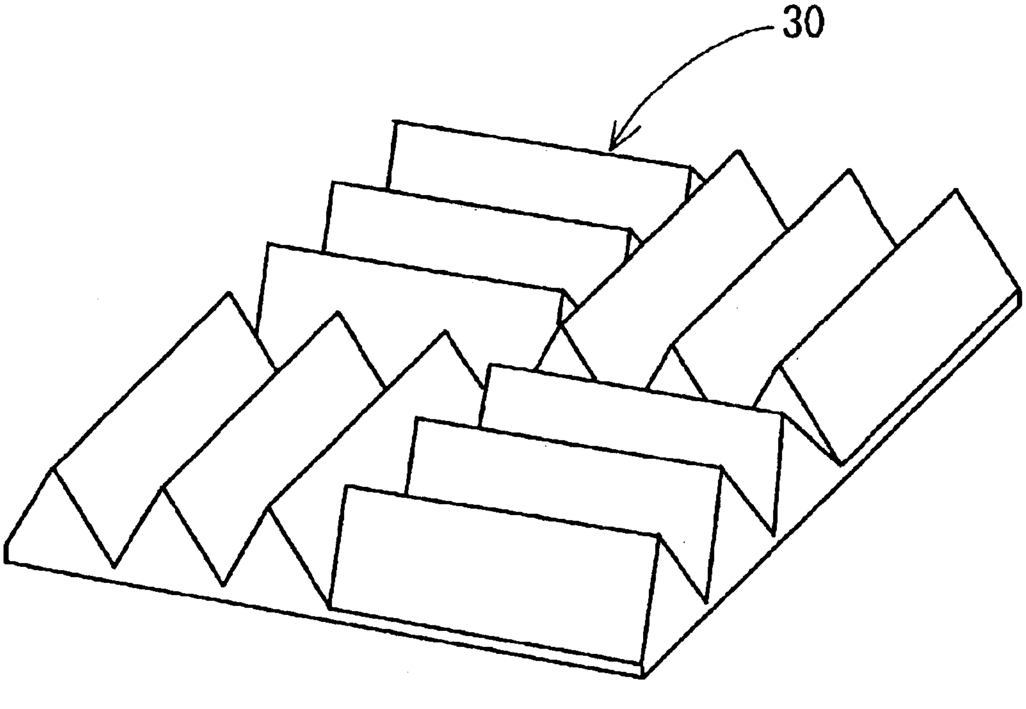
FIG. 8 is a perspective view of a foamed member B.

(1) Method of Experiment:

1) The frequency of sound to be absorbed was set at 1.6 kHz and the wavelength λ was obtained from the foregoing equation;

2) The difference H of the corrugations 30 was 53 mm on the basis of the obtained wavelength λ. An amount of absorbed sound was measured at every frequency regarding the foamed members A to D. The foamed member A had the corrugations 30 including a plurality of ridges and troughs formed alternately and extending in one direction as shown in FIG. 7. The corrugations 30 of the foamed member B included longitudinal corrugations and transverse corrugations formed alternately. The foamed member C had the corrugations 30 formed into a plurality of quadrangular pyramids. The foamed member D served as a blank and had no corrugations but a flat face.

3) An amount of sound absorbed per frequency was graphed.

Figure 9:
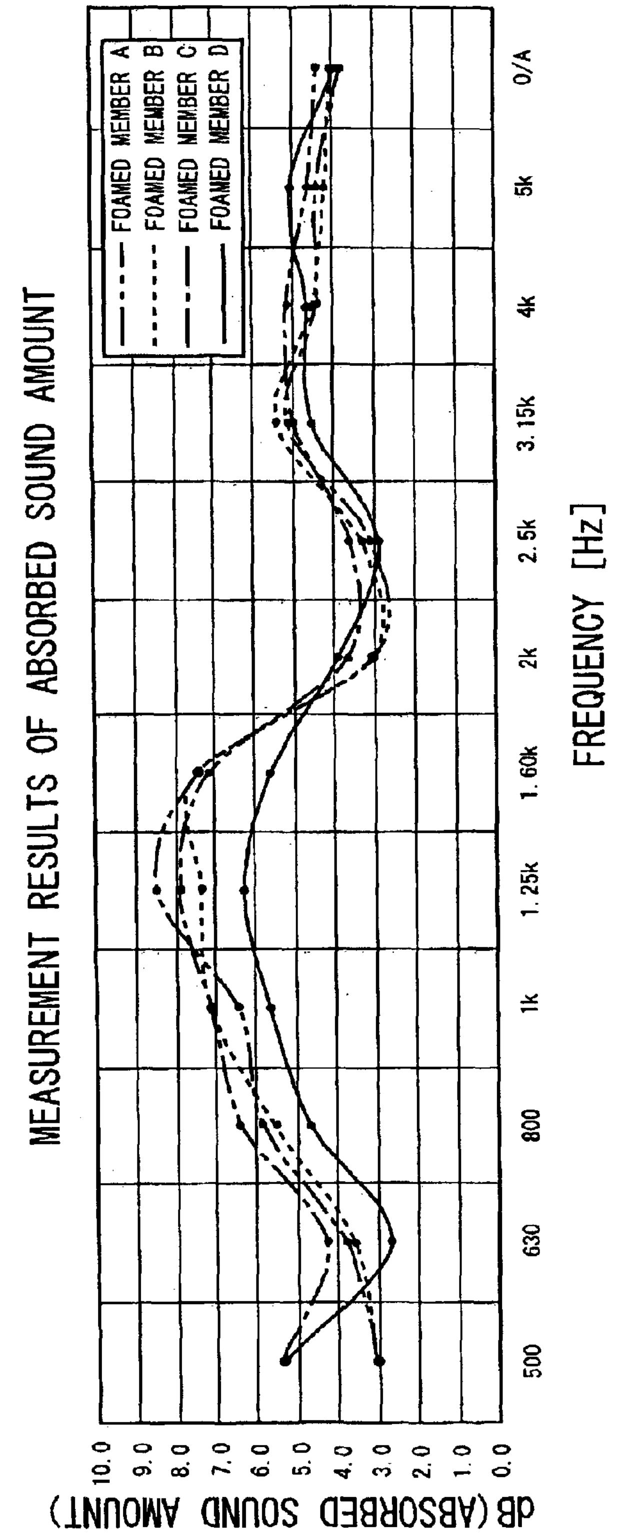
FIG. 9 is a graph showing results of experiment 1.

(2) Experimental Results:

The amounts of sound absorbed regarding the foamed members A to C are compared with reference to FIG. 9. Approximately the same amount of sound absorbed was obtained at every frequency in each foamed member. Further, when compared with the foamed member D with no corrugations, each of the foamed members A to C achieved a larger amount of sound absorbed than the foamed member D remarkably in the frequency range of 1.25 to 1.6 kHz. Thus, when the difference H is set at a quarter of the wavelength of the predetermined sound, the absorbed sound amount can particularly be increased at the frequency values of the predetermined sound and at frequency values near the frequency value of the predetermined sound.

Experiment 2:

The engine cover 10 of the foregoing embodiment was compared with an engine cover serving as a compared product. The foamed member of the compared product included a flat face covering the expanded portion. The compared product was the same as the engine cover 10 of the foregoing embodiment in the other respects.

Figure 10:
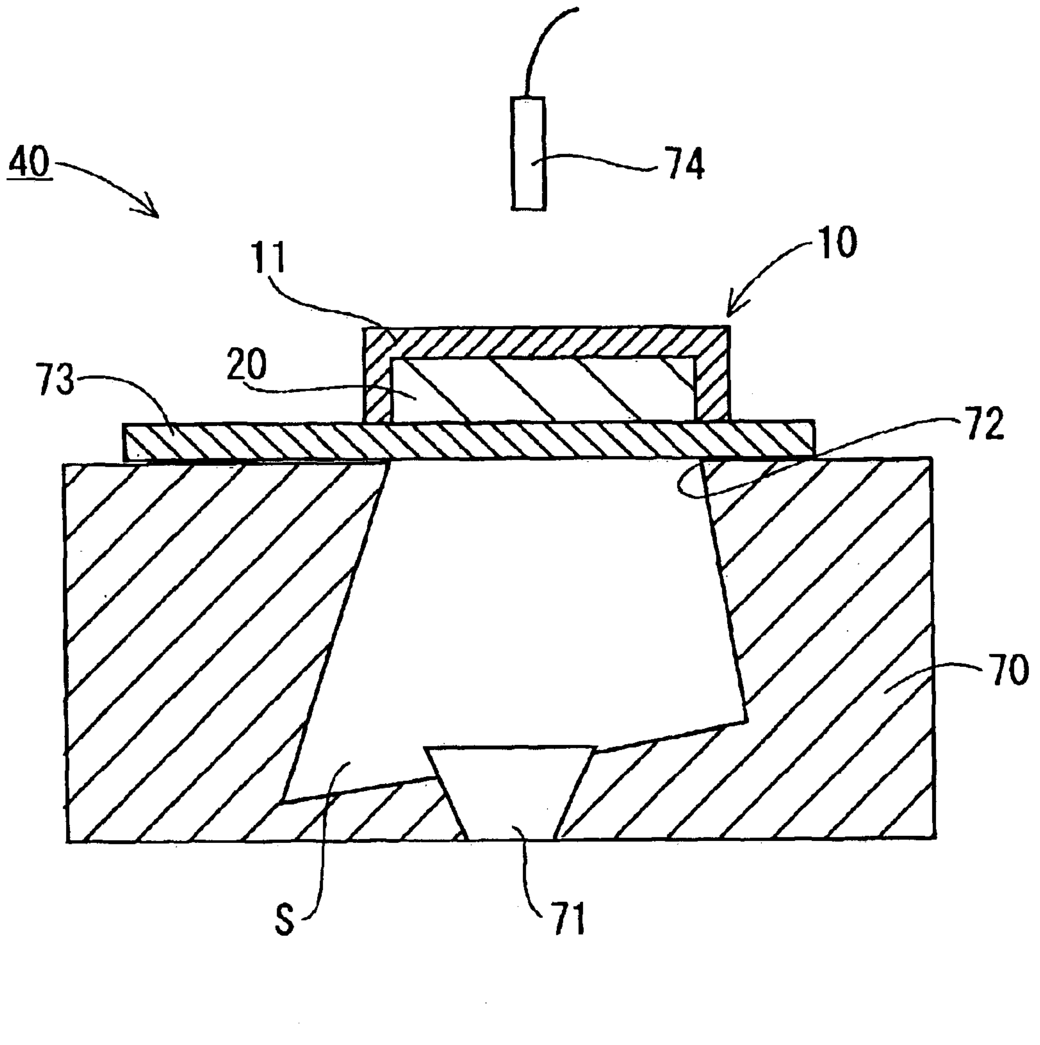
FIG. 10 illustrates a concept of a sound insulation evaluating apparatus.

(1) Method of Experiment:

A soundproof evaluation apparatus 40 as shown in FIG. 10 was used to measure a sound pressure level in the experiment. The apparatus 40 included a plaster container 70 in which a space S was defined by seven non-parallel sides and had an upper open end. A loud speaker 71 was disposed in the space S so as to be directed toward an opening 72 which was covered with an alloy cover 73 made from the same magnesium alloy as the upper end of the engine 90 was made from. A microphone 74 was disposed at a predetermined position above the alloy cover 73. The following is an experimental procedure:

1) Each engine cover was placed opposite the loud speaker 71 with the alloy cover 73 interposed therebetween.

2) The loud speaker 71 was energized to produce sound, and a sound pressure level was measured at every frequency by a microphone 74 set at a position 300 mm above each engine cover set on the alloy cover 73.

3) The measured sound pressure levels of the compared product and the embodiment were graphed.

Figure 11:
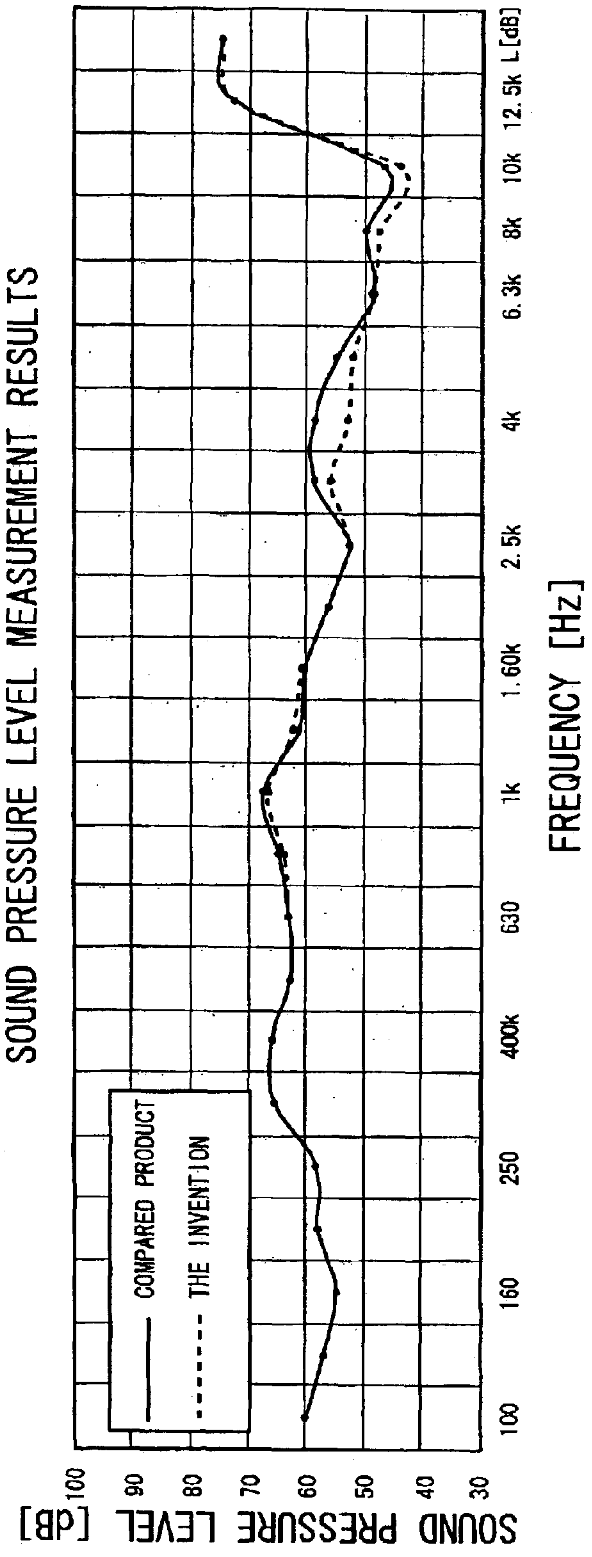
FIG. 11 is a graph showing results of experiment 2.

(2) Experimental Results:

When the engine cover 10 of the embodiment is compared with the compared product on the basis of the graph of FIG. 11, the sound pressure level in the embodiment is lower than or equal to that in the compared product in the overall frequency range. This reveals that the provision of the corrugations 30 on the foamed member 20 can improve the soundproof performance of the engine cover 10. Furthermore, the difference H is set at 21 mm in the engine cover 10 of the embodiment. The sound pressure level is lower in the frequency range of 3 to 6 kHz in the engine cover 10 of the embodiment than in the compared product. This reveals that the soundproof effect can sufficiently be improved on the sound produced by the engine and having the frequency of about 4 kHz.

Figure 12:
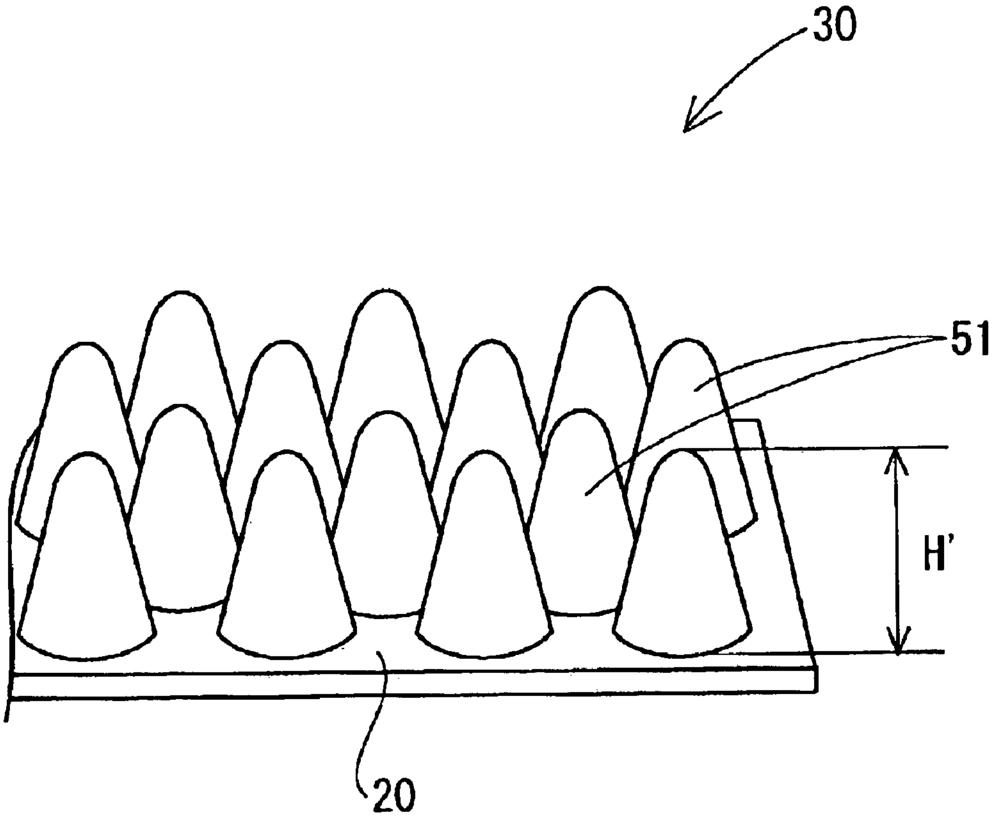
FIG. 12 is a perspective view of a foamed member used in experiment 3.
Figure 13:
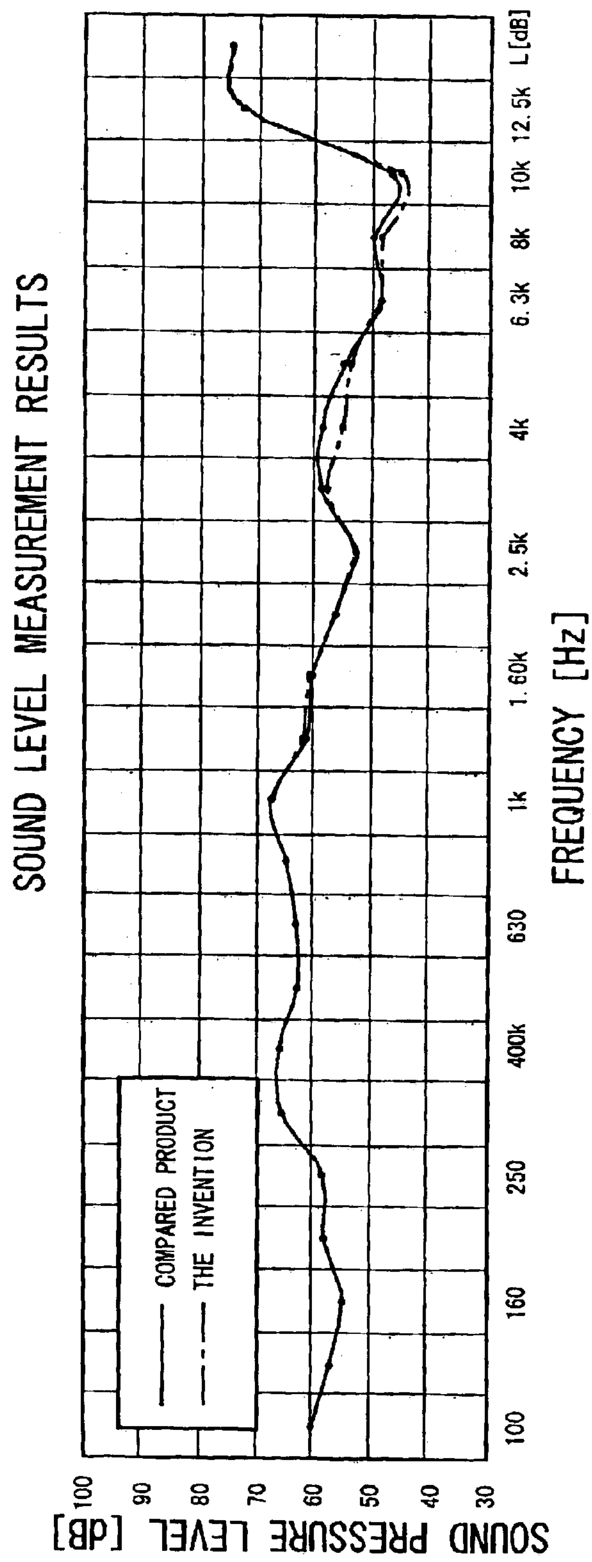
FIG. 13 is a graph showing results of experiment 3.

Experiment 3:

Only the shape of the corrugations 30 in experiment 2 was changed and the experimental contents were the same as those in experiment 2. More specifically, the corrugations 30 of the foamed member 20 were formed into a plurality of conical protrusions 51 as shown in FIG. 12. The difference H' was set at 21 mm. The experiment was carried out in the same manner as in the second experiment. Consequently, as shown in FIG. 13, the soundproof effect was improved on the sound whose frequency was about 4 kHz.

Each corrugation of the engine cover 10 is conical in shape in the foregoing embodiment. However, each corrugation may be formed into the shape of a pyramid such as a triangular pyramid or the shape of a hemisphere.

The difference H should not be limited to the value of 21 mm. The difference H may be set at a desired value so that sound having a frequency according to the set difference H is absorbed.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. An engine cover comprising:

a rigid cover body made of a resin or metal and covering an engine;

a foamed member fixed to an inner face of the cover body and including at least a part thereof spaced from the engine; and a plurality of corrugations formed on the part of the foamed member spaced from the engine, the corrugations including a row of protrusions arranged transversely so that convex and concave portions are provided alternately repeatedly, wherein a sound produced by the engine contains a predetermined sound, and a difference between a ridge of each protrusion and a trough between said each protrusion and the adjacent protrusion is set at a quarter of a wavelength of the predetermined sound, the quarter being multiplied by any integer.

2. An engine cover according to claim 1, wherein the protrusions are conical protrusions.

3. An engine cover comprising:

a rigid cover body made of a resin or metal and covering an engine;

a foamed member fixed to an inner face of the cover body and including at least a part thereof spaced from the engine, the foamed member including an abutment abutted against the engine; and a plurality of corrugations formed on the part of the foamed member spaced from the engine, the corrugations including a row of protrusions arranged transversely so that convex and concave portions are provided alternately repeatedly, wherein a sound produced by the engine contains a predetermined sound, and a difference between a ridge of each protrusion and a trough between said each protrusion and the adjacent protrusion is set at a quarter of a wavelength of the predetermined sound, the quarter being multiplied by any integer.

4. An engine cover according to claim 3, wherein the protrusions are conical protrusions.

5. An engine cover comprising:

a rigid cover body made of a resin or metal and covering an engine;

a foamed member fixed to an inner face of the cover body and including at least a part thereof spaced from the engine; and a plurality of corrugations formed on the part of the foamed member spaced from the engine, the corrugations including a row of protrusions arranged transversely so that convex and concave portions are provided alternately repeatedly, each protrusion having a generally triangular section and being tapered toward a ridge thereof, wherein a sound produced by the engine contains a predetermined sound, and a difference between a ridge of each protrusion and a trough between said each protrusion and the adjacent protrusion is set at a quarter of a wavelength of the predetermined sound, the quarter being multiplied by any integer.

6. An engine cover comprising:

a rigid cover body made of a resin or metal and covering an engine;

a foamed member fixed to an inner face of the cover body and including at least a part thereof spaced from the engine; and a plurality of corrugations formed on the part of the foamed member spaced from the engine, wherein a sound produced by the engine contains a predetermined sound, and a difference between a ridge of each protrusion and a trough between said each protrusion and the adjacent protrusion is set at a quarter of a wavelength of the predetermined sound, the quarter being multiplied by any integer.

* * * * *